July 21, 1959   G. L. JONSSON ET AL   2,895,592
DOWNWARD DISCHARGE CONVEYOR
Filed July 6, 1954   7 Sheets-Sheet 1
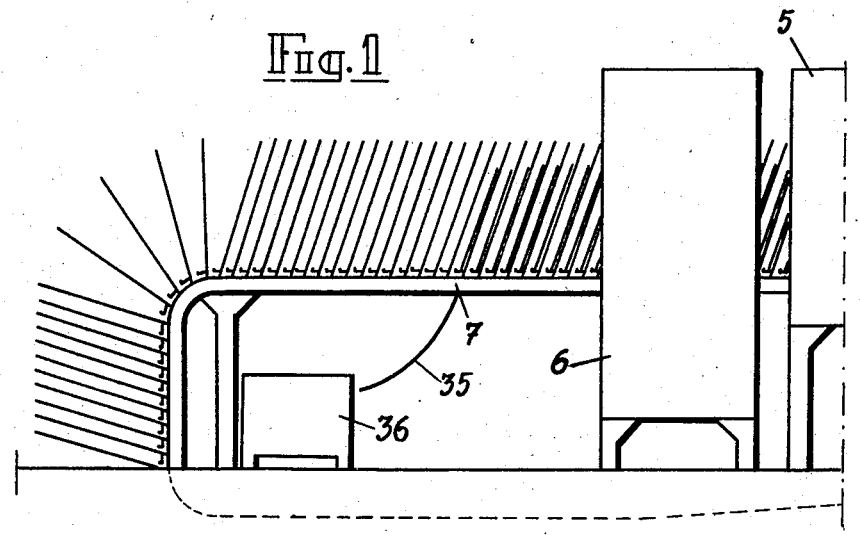
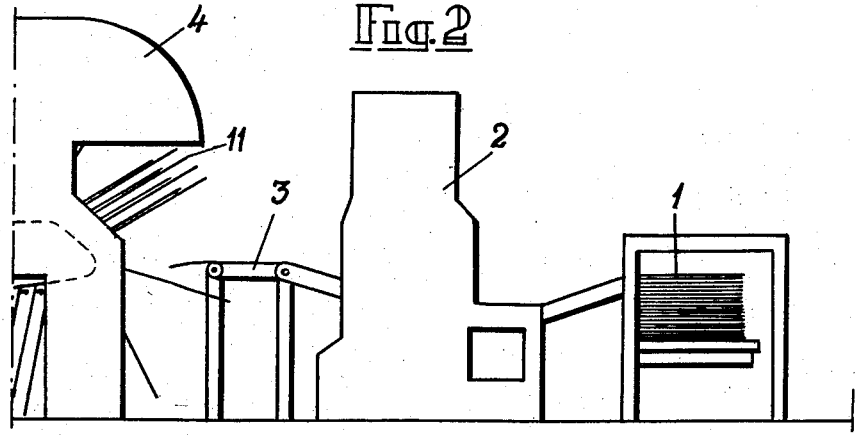
Inventors
G. L. Jonsson
K. G. Andersson
By Stewart Downing Seebold
Attys.

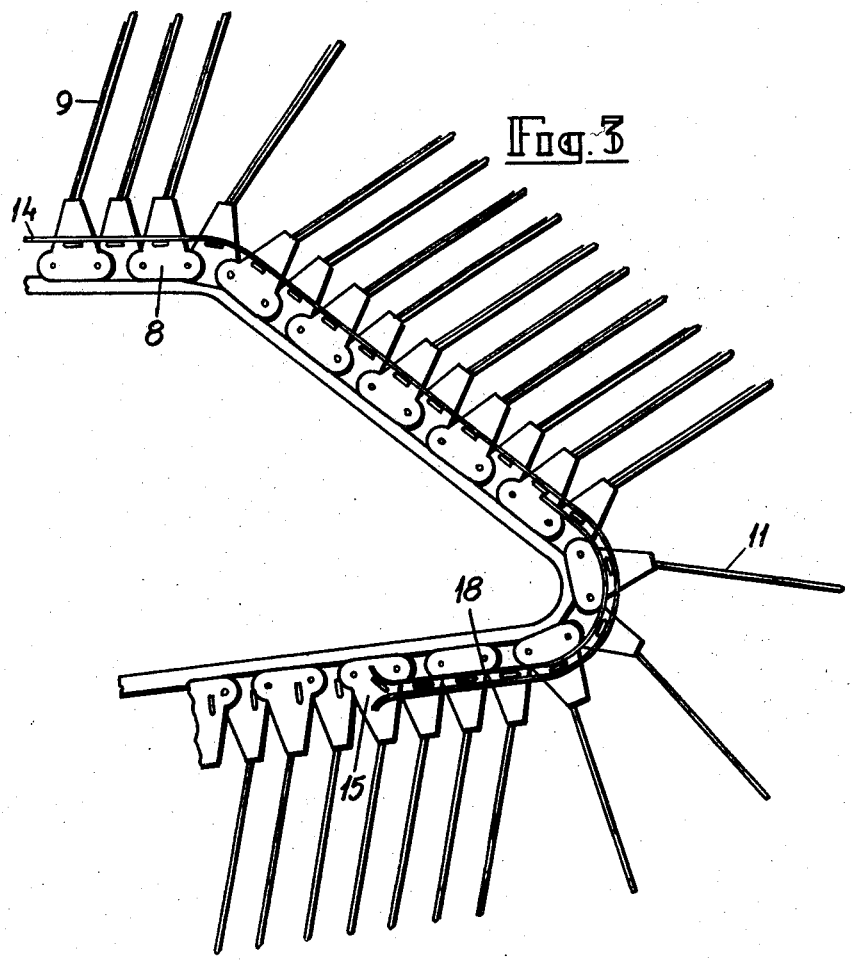
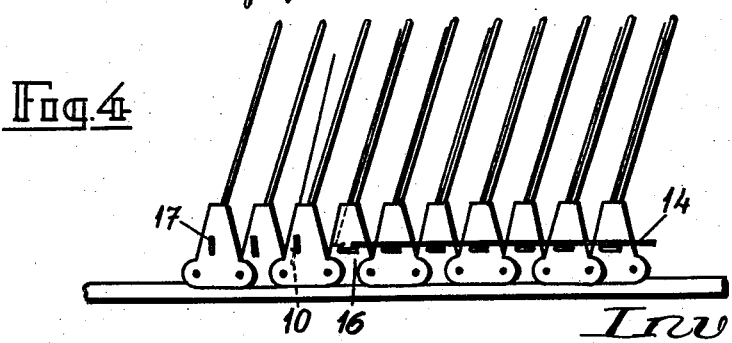

Inventors
G. L. Jonsson
K. G. Andersson

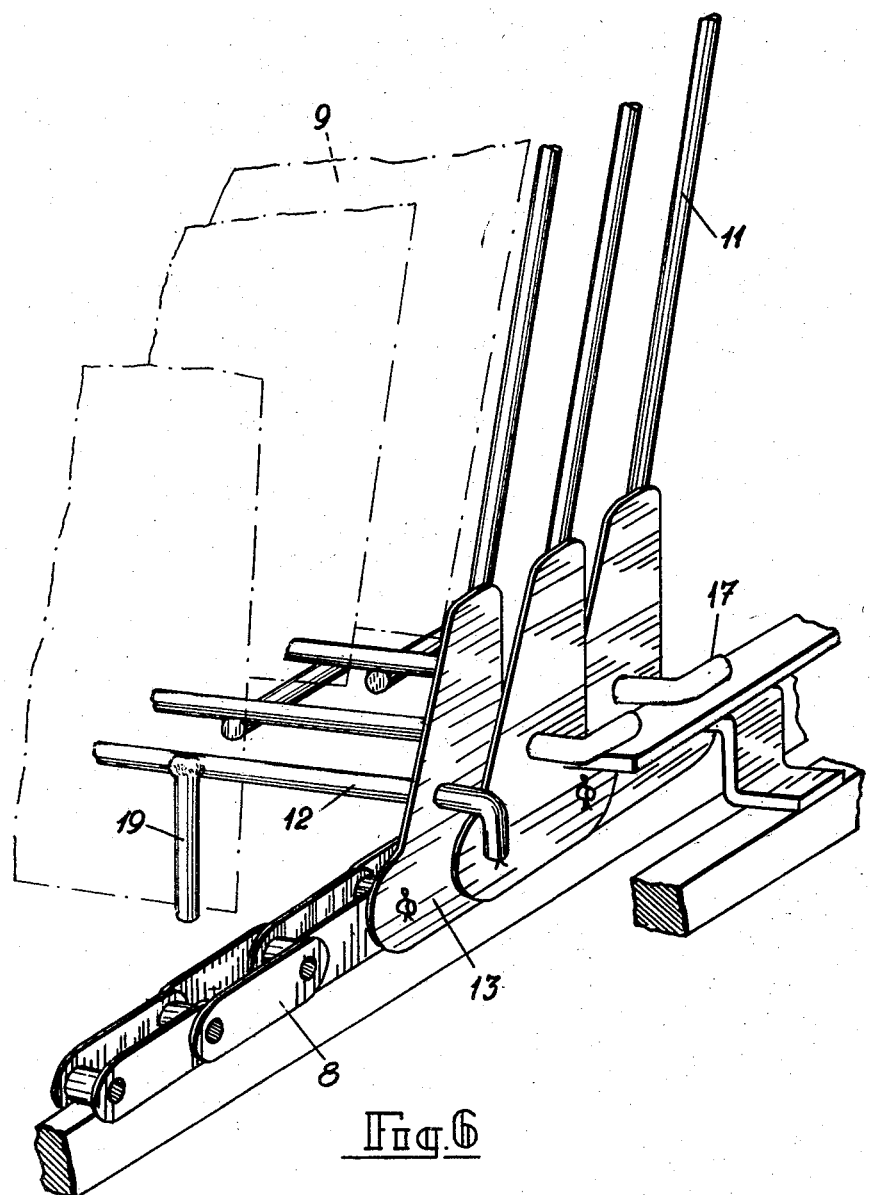

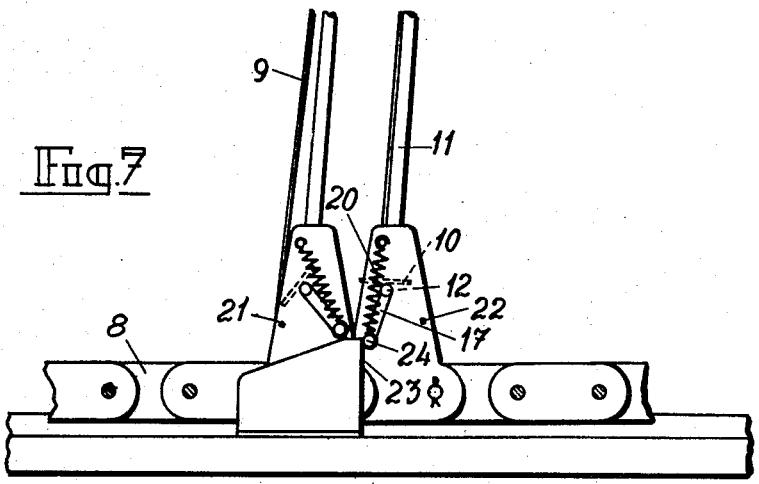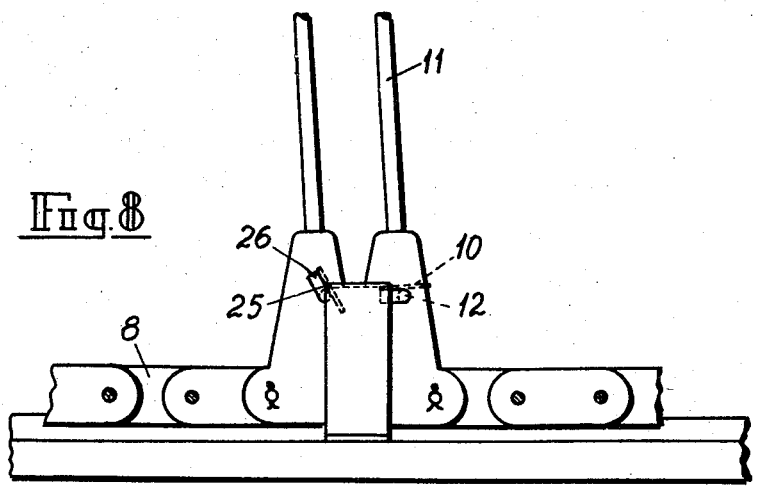

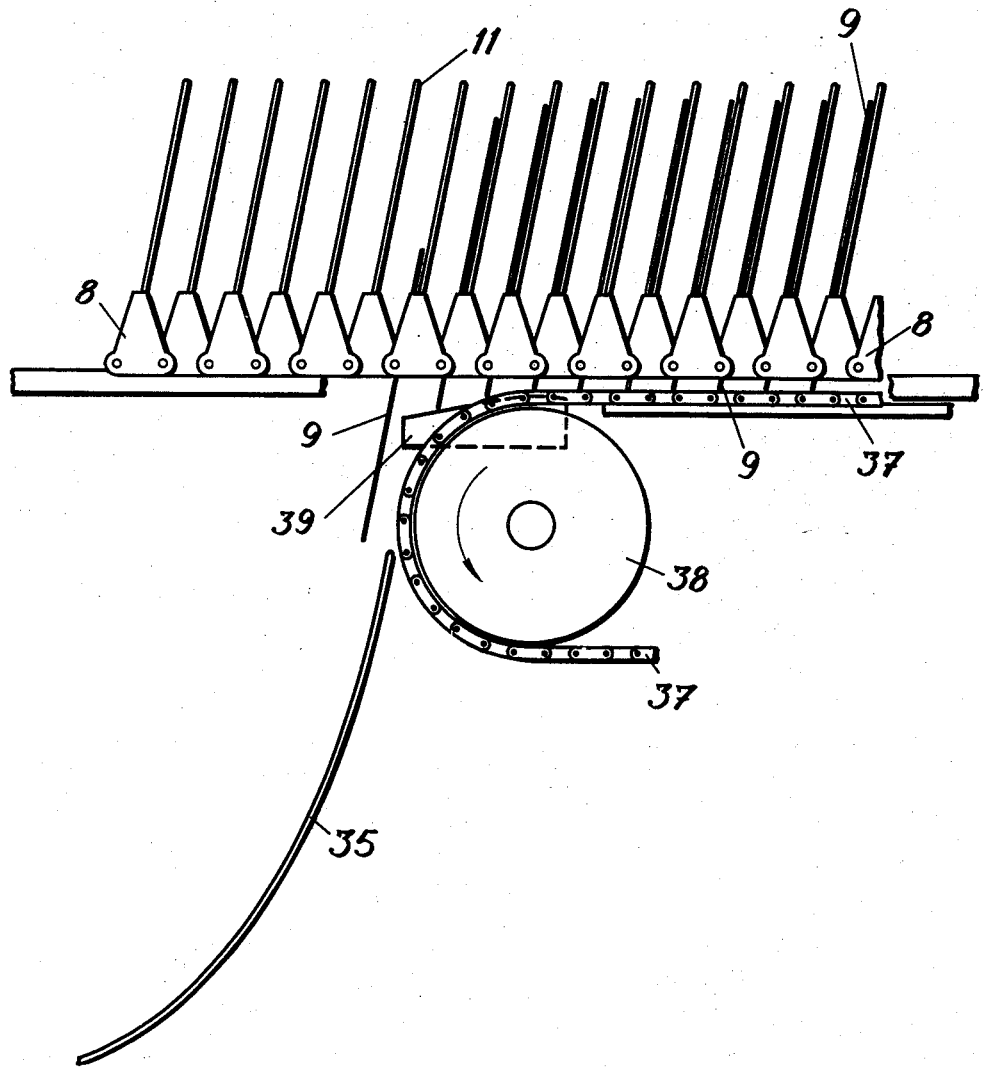

2,895,592
DOWNWARD DISCHARGE CONVEYOR

Gösta L. Jonsson and Karl G. Andersson, Lysekil, Sweden

Application July 6, 1954, Serial No. 441,574

Claims priority, application Sweden July 11, 1953

13 Claims. (Cl. 198—134)

This invention means a device for removing plates bearing colour print, chromotype, lacquer or the like from a conveyer which has been contrived to forward the plates in a chiefly upright position through an oven for drying the colour print etc.

The purpose of the invention is to effect a contrivance of this kind so conditioned as to prevent the colour print from being damaged while the plates are in transit from the conveyer and which contrivance must be simple in its execution and also be working automatically.

The invention is mainly characterized therein that means are provided for the removal of the plates while the plates remain in an upright position and before they reach the end of the conveyer.

Figure 5:
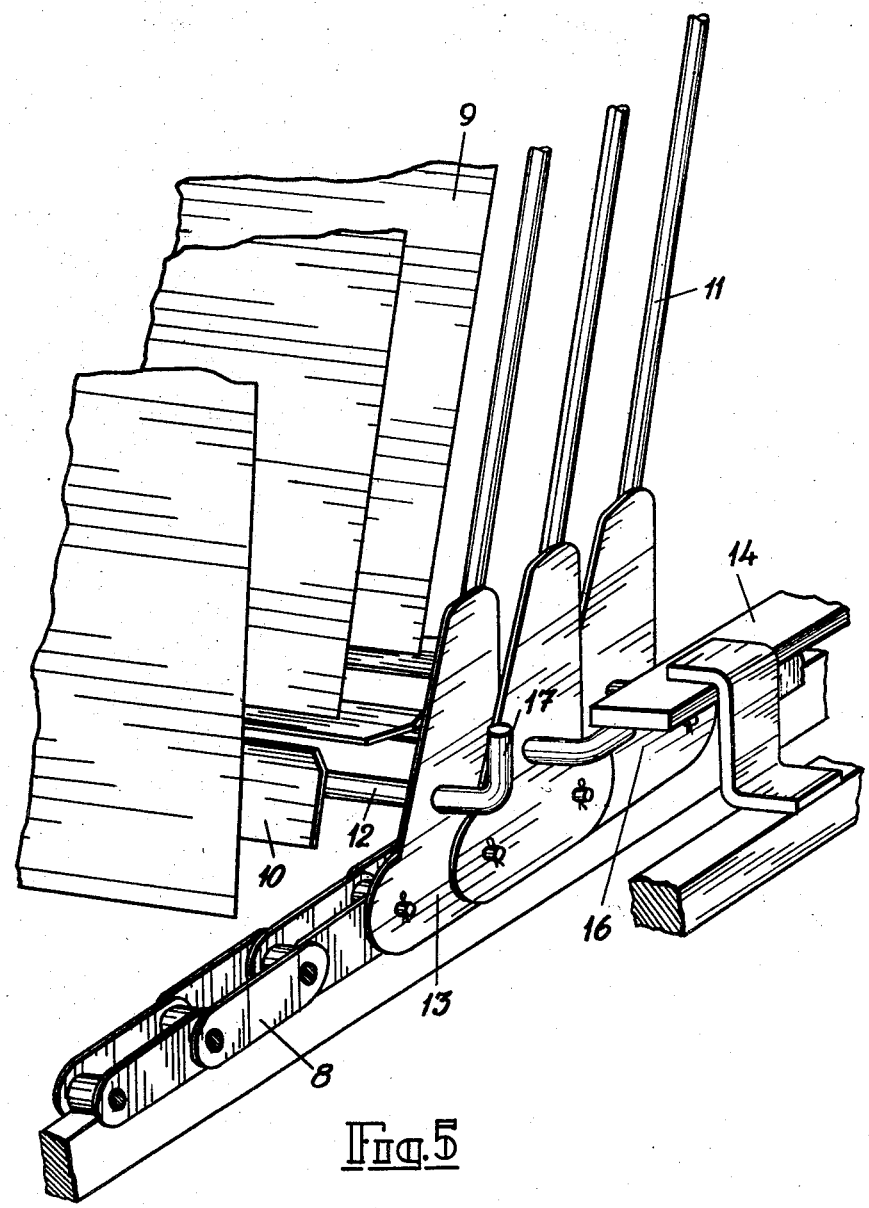
Figure 9:
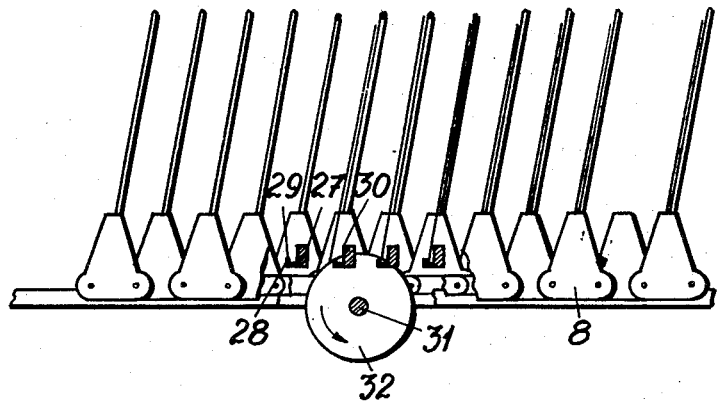
Figure 10:
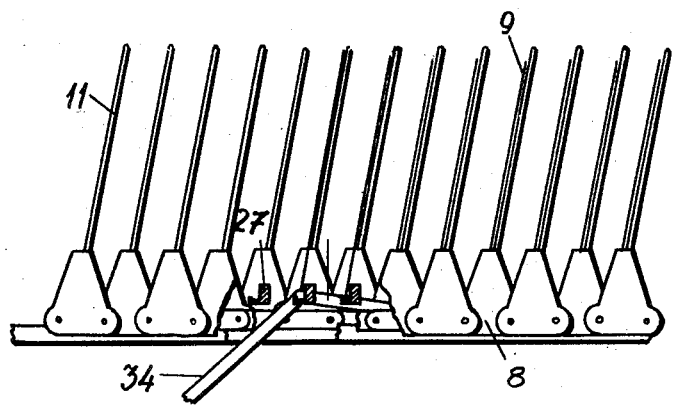

The invention will be further described as follows, with reference to the accompanying drawings, which serve to illustrate some forms of execution of the invention. Fig. 1 is a schematic side view of the foremost part of an oven with a conveyer made in accordance with the invention. Fig. 2 constitutes a side view of the rear part of the same oven, and with a contrivance for furnishing plates or the like with colour print, chromotype, lacquer or the like. Fig. 3 is a side view of the rear part of the conveyer in accordance with a form of execution of the invention. Fig. 4 is a side view of that part of the conveyer where the plates will be removed. Fig. 5 is a perspective view of the part of the conveyer as shown in Fig. 4. Fig. 6 is a perspective view similar to the one shown in Fig. 5 but where the members serving to carry the plates have been made in a different way. Fig. 7 is a side view of another form of execution of the invention, showing that part of the conveyer where the plates are being removed. Fig. 8 is a side view as seen from the opposite side to Fig. 7. Fig. 9 is a side view of a third form of execution, showing that part of the conveyer where the plates are being removed. Fig. 10 is a similar side view of one more form of execution. Fig. 11 is a similar view of a further form of the invention.

In the drawing 1 shows a pile of plates which are to be furnished with colour print in the contrivance 2, whence the plates, aided by a conveyer 3, are forwarded one by one to the entrance end of an oven 4 for the drying of the colour print on the plates. 5 shows the exit of the oven and 6 a contrivance in front of it, for cooling the plates. A conveyer 7 is arranged for forwarding the plates through the oven where the plates take an upright position, leaning slightly backwards, while colour print is on the front surfaces of the plates and back surfaces of the plates or some of their edges are resting against the contrivance further described below. The conveyer 7 is of the kind that includes two longitudinally movable laterally-spaced conveying devices in the form of endless chains 8 placed on either side of the transport track of the plates, where groups of two links one on either side of the transport track hold a support device including a sheet carrier frame 11 for a plate 9. The support device also includes one or several supporting members 10 intended to co-operate with the bottom edge of a plate. Upright support member 11 co-operates with the back of a plate or with one of the other edges so that a plate or sheet 9 is held substantially vertically.

In the form of execution as shown in Figs. 3–5 the sheet supporting means 10 consists of a longish plate which is, at one of its long edges, fixed to a shaft 12 which is horizontally arranged and stretches right over the transport track between the two chains 8. While in operation the support member 10 has a forward direction, as will most clearly be seen from Fig. 5. The shaft 12 is carried in bearings in plates 13 connected with the chains and each pair of the plates 13 sustains a support member 11. The latter constitutes an U-shaped bow made of metal wire, the median part of which is at the top, while the shanks are fixed to the plates 13.

14 is a bar stretching from one point 15 at the lower side of the transport track and in the neighbourhood of the entrance point of the oven, parallel with the transport track to a point 16, which is located at the upper side of the transport track at a considerable distance from the foremost end of the transport track and at some distance in front of the cooling contrivance 6. This bar 14 is meant to co-operate with an arm 17, projecting radially from the shaft 12, and then under co-operation from the arm the shaft 12 is held in such a revolving position as to hold the support member 10 in an active position, i.e. it is largely horizontal or leaning slightly backwards, regarded in the width direction. As will be most clearly seen from Fig. 5, the arms 17 will be released from the bar 14 at the point 16 of the transport track forming a discharge point for the conveyer, and then the support member 10—partly by dint of its own weight and partly owing to the weight of the plates 9—will be swung into a downwards pointing position, whereby the plates are released and are allowed to fall down from the conveyer between the chains 8. The members 10 will then remain in this position till the arms 17 come in contact with the other end of the bar 14, which is at point 15 when the arms 17 and consequently the shafts 12 with the members 10 are swung into active position. In order to facilitate this regulation of the members 10 there is at the last-mentioned end of the bar 14 one or more bars 18 located on the opposite side of the arms 17 and running parallel with the bar 14 past that part of the transport track where the plates are loaded on to the conveyer.

In the form of execution shown by Fig. 6 the support members designed for co-operation with the lower edges of the plates consist of one or several arms 19 projecting from the shaft 12, which arms extend backwards from the lower part of the support members 11. As will be seen from this figure, the arms 19 have, in regard to their length, been so formed that, while in operation, they will extend in under the shaft 12, of the following link. This form of execution deviates from the preceding in so far that the support members 19 are meant to co-operate with the lower edge of a plate resting against a bow 11 of the support device behind.

In the form of execution as per Figs. 7 and 8 those details which are identical with the preceding forms of execution have been given the same marks of reference. This form of execution resembles the one shown by Figs. 3–5 also in so far that each support device for a plate includes—besides the bow 11—also a longish plate 10 to co-operate with the lower edge of a plate furnished with colour print while the plate or the support member 10 is turnable around a shaft 12, which is possessed of an arm 17. The arm 17 is in this case not meant to co-operate with any bar 14 for remaining in the operating position, for the arm is impelled by a draw spring 20, the one end of which is connected with the free end of the arm 17, and whose other end is fixed to a point which is diametrally opposed to the point constituting a median position on dead center for the free end of the arm when the arm is swinging between two stop positions. The swing of the arm 17 is confined by two stops 21, 22, and it is evident that the retention of the arm in these stop positions is effected by means of the draw spring 20 pressing the arm on to the stops. Stop 21 serves to confine a continued swing of the arm 17 after the support member 10 has got into a working position while the stop 22 serves to confine a continued swing of the arm 17 after the support member 10 has taken a forwards and downwards leaning position, where the colour printed plate will be removed, as shown to the left of Fig. 7. For the swing of the arm 17 to conduct the support member 10 to a passive position and admit of the plate being removed there is a shoulder 23 located at the outermost side of one of the transport chains 8 and which is designed to co-operate with a tap 24 projecting at right angles from the arm 17. There, the whole is so arranged that when the tap 24 hits the arm 23 then the arm 17 is swung from the stop 21, and the spring 20 is set. The spring will attain its greatest tension when its length direction crosses the lengthening of the shaft 12, in which position the arm 17 may by a slight continued actuation by means of the shoulder 23 be swiftly swung over to the stop 22 by the spring 20. In order to reconduct the support member 10 to an active position there is one more shoulder 25 in a suitable place in front of the shoulder 23 also behind the entrance end of the oven so that support member 10 is swung into active position in ample time before the insertion of a colour printed plate. The shoulder 25 is meant to have co-operation with an arm 26, projecting radially from the other end of the shaft 12 as shown in Fig. 8. In passing the shoulder 25 the arm 26 and thereby the shaft 12 and the arm 17 are swung till the shaft 12, impelled by the spring 20, is swung on to and retained at the stop 21.

The form of execution as per Fig. 9 deviates essentially in as much as in this form of execution the support members consist of permanently arranged feet or bars 27 and where the removal of plates is effected by means of a member constructed to have the plates raised from the support members 27 and forwarded in a direction from the foremost ends of the support members 28 so that the plates may fall down from the transport track. Each support member 27, at its foremost end 28, shows an upright edge 29, which serves to prevent the lower edge of the plate in question from being unintentionally pushed forwards and past the foremost end 28. As will be gathered from the middle part of Fig. 9, the hindmost, upright part of the foot is possessed of an edge 30, which is intended to co-operate with the back of the plate for the purpose of preventing the plate from being pushed backwards to a not desirable extent. In fact, the edge 30 serves to accomplish that the lower edge of the plate should be in the vicinity of the foremost end 28. The member serving to raise the plates and to forward them from the support member 27 will in this case consist of a roll 32 or the like, which is freely rotatable around an axle 31, the roll being lodged between the chains 8 and being so arranged as to let its upper part stretch somewhat above the motion track of the lower edges of the plates. In consequence, the plates will place themselves with their lower edges on to the periphery of the roll 32 while—owing to the friction between the said periphery and the edge—the roll will rotate in the direction indicated by the arrow. Now the plate is raised to find itself above the edge 29, and the edge of the plate having passed the vertical middle plane, the plate through its own weight is forwarded downwards and past the foremost end of the support member and falls down from the transport track.

As mentioned in the preceding, the raising member constitutes a roll 32, but is obvious that instead of a roll a number of such or wheels may be employed, such wheels whose axles are horizontal, the same as the axle 31, i.e. parallel with the lower edges of the plates. Instead the roll 32 etc. can have a compulsory rotation, e.g. be impelled by the chains 8 of the conveyor, in which case the rotation need not be continuous, for the roll may be intermittently rotatable within a certain angle and in this case a locking device is installed to form a temporary limit to the rotation of the roll. In this case the roll may at its one end be furnished with a number of projections or the like arranged at mutually fixed angle distance and calculated to be impelled by stops on the conveyor so that the roll is rotated a certain angle under co-operation from a projection with the stop in question. Furthermore, the roll can be rotatable at a speed which is higher or lower than the speed by which the plates are transported. The peripheral surface of the roll can be rifled or it may consist of rubber or some similar material to create sufficient friction between this surface and the lower edges of the plates, which serves to prevent sliding between these while the plates are being lifted. For the same reason the roll may instead at its periphery be equipped with teeth or the like purposed to co-operate with the lower edges of the plates. In the form of execution as per Fig. 9 the roll has been placed at a horizontal part of the transport track, but in certain cases it may be suitable to apply the roll in connection with the downwards sloping part of the motion track.

The form of execution as per Fig. 10 resembles the one shown by Fig. 9 in so far that the support members for co-operation with the lower edges of the plates are in a fixed position and consist of feet 27. Here instead of the roll 32 there is a fixed guide surface, for the lower edges of the plates, which guide surface stretches askew upwards in its relation to the motion track for the lower edges of the plates and is purposed for lifting the plates from the support members. The guide surface 33 is combined with another guide surface 34, stretching askew downwards from the first guide surface 33 and it serves to conduct the lower edges of the plates in a direction from the foremost ends of the support members and to admit of the plates falling down from the transport track. These guide surfaces 33, 34 can—the same as the roll 32—be arranged in connection with a downwards slanting part of the motion track of the support members 27.

In the form of execution as per Fig. 11 there are some endless chains 37 or the like provided between the transport chains 8. These endless chains 37 are intended to carry the plates 9 while these are resting against the upright support members 11 from this end of the conveyor track where the plates enter to a point before the other end of the track, where a return pulley 38 for the chains is arranged around which the chains 37 turn downwards so that the plates, when reaching this pulley, can fall down from the conveyor. In order to achieve a more exact discharge point than which will be achieved if during the starting of the discharge the plates are to follow the downwardly bent track of the chains 37 around the said pulley 38 can as shown in Fig. 11 two or more rails 9 or similar be arranged between the said supporting chains. These rails have their upper edges somewhat lower than the support chains and thus the plates cannot contact the rails until the supporting chains have started the movement downwardly. The below edges of the plates 9 slide thereafter along the rails 39 forwardly to their end points and thereafter the plates are falling down between the conveyor chains 8.

In all the forms of execution now described may—as shown by Fig. 1 at 7—a downwards slanting transport track 35 be arranged for forwarding the plates to a point underneath the conveyer and a there located pile for plates, as well as a device, e.g. a footstool, on which the plates are placed, to be then forwarded to the intended place by means of a fork lift truck or the like.

The constructive execution of the invention is, of course, not confined only to the forms of executions now illustrated and described, for it may in its details find variations within the range of the invention. The essential point of the invention is that the arrangement is such as to admit of the removal of the plates while remaining in an upright position and before they reach the end of the transport track.

What we claim is:

1. A conveyor device comprising endless rotatable members having support means for plates, each support means comprising a lower element for co-operation with the lower edge of a plate and another means extending upwardly from the members and adapted to cooperate with the back side of a plate, the support means being so arranged that the plates during the transport are held in a substantially upright position, and means rendering the lower elements of said support means inoperative for removing the plates edgewise downwardly by gravity between the rotatable members before the plates reach the end of the upper run.

2. A conveyor comprising two endless conveyor chains arranged on either side of a track, in which groups of two links one on either side of the track carry a support device for a plate, said support device consisting of an upright support member for cooperation with the back of a plate, and at least one endless chain arranged between the endless conveyor chains, which endless chain supports the plates while they are resting against the upright support members and extends to a point short of the end of the track so that the plate will be discharged downwardly from the conveyor.

3. A conveyor apparatus comprising a pair of longitudinally movable laterally spaced conveying devices, a plurality of sheet carrier means secured at their opposite lateral edges to said conveying devices, said sheet carrier means each comprising a support for the lower edge of a sheet, and means at a discharge station to render each said support inoperative whereby a sheet being conveyed will be discharged by gravity between said pair of conveying devices before the plates reach the end of the upper run.

4. A conveyor apparatus comprising a plurality of longitudinally-movable laterally-spaced conveying devices, a plurality of sheet carrier frames secured near their opposite lateral edges to said conveying devices, to provide access to said frames at locations between said conveying devices, said carrier frames each having sheet supporting means adjacent the lower edges thereof to support a sheet against downward movement as it is held substantially vertically by the adjacent said carrier frame, and means at a discharge point to render each said sheet supporting means inoperative before they reach the end of the upper runs whereby said sheets will pass downwardly between said conveying devices at said discharge point.

5. The conveyor apparatus of claim 4 in which said sheet supporting means is mounted on a shaft parallel to said sheet carrier frames and means are provided to rotate said shafts at said discharge point to swing each said sheet supporting means out of its active position so it cannot support a sheet.

6. The device of claim 5 in which said sheet supporting means are mounted on the forward sides of said shafts, said shafts lying in the planes of or behind said sheet carrier frames.

7. The device of claim 5 in which said sheet supporting means are mounted on the rearward side of said shafts, said shafts lying substantially forward of the planes of said sheet carrier frames.

8. A conveyor apparatus according to claim 5, characterized in that the means to rotate said shaft to swing said sheet supporting means out of active position includes a stop, which is fixed in relation to the conveyor, and an arm projecting radially from the shaft of the support members to engage said stop.

9. A conveyor apparatus according to claim 5, characterized by a fixed guide bar which is parallel with the track of the conveying devices and an arm projecting from the shaft of each of said sheet supporting means and adapted to co-operate with said guide bar for the purpose of holding the support members in their active position, the guide bar being arranged with one of its ends near said discharge point where the sheets are to be released from the sheet support means so that the said means will swing from active to inactive position.

10. The conveyor apparatus according to claim 5 in which each said shaft is provided with an arm extending radially and a tension spring is fastened to said arm and to a fixed point on said longitudinally movable conveying device so that as said shaft is rotated between its active and inactive positions said spring passes over a dead center, and stops are provided to limit the rotation of said shaft to each side of the dead center.

11. The conveyor apparatus of claim 4 in which said sheet supporting means are fixed to said sheet carrier frames and means are provided adjacent said discharge point to lift each sheet off of said sheet supporting means and to force the edge of said sheet forwardly beyond the front of said sheet supporting means so it will be discharged downwardly.

12. The device of claim 11 in which said means adjacent said discharge point comprises at least one roller.

13. The device of claim 11 in which said means adjacent said discharge point comprises a stationary cam.

References Cited in the file of this patent

UNITED STATES PATENTS

| | | |
|---|---|---|
| 973,422 | Gifford | Oct. 18, 1910 |
| 1,319,077 | Hickcox | Oct. 21, 1919 |
| 1,343,184 | Baker et al. | June 8, 1920 |
| 2,576,218 | Fox | Nov. 27, 1951 |